United States Patent [19]

Natter et al.

[11] 4,042,922
[45] Aug. 16, 1977

[54] MULTI-MODE RADAR SYSTEM

[75] Inventors: Eckard F. Natter, Coral Springs; George E. Weant, Fort Lauderdale; James R. Lobsinger, North Lauderdale, all of Fla.

[73] Assignee: The Bendix Corporation, Southfield, Mich.

[21] Appl. No.: 720,338

[22] Filed: Sept. 3, 1976

[51] Int. Cl.² .......................... G01S 7/40; G01S 9/60
[52] U.S. Cl. ............................ 343/5 W; 343/5 AF; 343/5 SM; 343/17.7
[58] Field of Search ............... 343/5 SM, 5 W, 5 AF, 343/17.7

[56] References Cited
U.S. PATENT DOCUMENTS

| 3,573,826 | 4/1971 | Fredericks | 343/17.7 |
| 3,775,766 | 11/1973 | Gendreu et al. | 343/5 W X |
| 3,781,878 | 12/1973 | Kirkpatrick | 343/5 W |
| 3,881,154 | 4/1975 | Lewis et al. | 343/5 W X |
| 3,896,382 | 7/1975 | Magenheim | 343/5 W X |

FOREIGN PATENT DOCUMENTS

| 581,448 | 8/1959 | Canada | 343/5 SM |

Primary Examiner—Malcolm F. Hubler
Attorney, Agent, or Firm—W. G. Christoforo; Bruce L. Lamb

[57] ABSTRACT

A multi-mode radar includes a local oscillator referenced to the radar magnetron and includes logic provided to side step the local oscillator during the latter portion of the radar interpulse period so as to permit adjustment of the receiver gain during this period without interference from distant targets. In addition, IF amplifiers are selectable in accordance with the operational radar mode selected.

2 Claims, 3 Drawing Figures

MULTI-MODE RADAR SYSTEM

BACKGROUND OF THE INVENTION

This invention relates to multi-mode radar systems and particularly to an improved airborne radar system which can be used to selectively map weather conditions or interrogate navigation beacons and display the responses thereto.

Airborne weather radar systems installed in aircraft are known which operate in the X-band of microwave frequency and which have means for transmitting a radar pulse into space and for receiving and displaying the radar energy reflected from weather cells such as clouds, rain and other forms of precipitation.

It is desirable that the radar gain be adjusted by the automatic gain control (AGC) circuits during each period between successive radar pulse transmissions. This interpulse period gain adjustment must, of course, be accomplished after all radar returns of interest have been received and displayed by the radar system, that is, after targets within the maximum range of interest have been displayed.

Since the purpose of the gain adjustment is to keep noise at a constant level it is important that the adjustment be made during the time that no signal return of interest is being intercepted by the radar system. However, returns from targets beyond the maximum range of interest will continue to be intercepted by the radar system even though such target returns are not to be displayed on the system display. In the present embodiment, rather than spacing successive radar pulses at relatively long intervals in order to permit the receiver gain adjustment to be made only after the radar returns have been effectively attenuated into the noise, a side step generator is provided which side steps the local oscillator to thereby detune the radar receiver out of the expected radar return frequency so that after radar returns from the maximum range of interest have been intercepted the receiver is off-tuned or side stepped to a free portion of the frequency spectrum and the gain then adjusted.

It is also known that the weather radar transmitter frequency can be selected by the system designer to be equal to the standard radar ground beacon interrogation frequency and the weather radar thereafter used in a navigational mode to interrogate such ground beacons. Ground beacon responses to such interrogations are pulse space coded and transmitted at a predetermined frequency which is somewhat different from the interrogation frequency. The present embodiment shows how, with a minimum of hardware, the airborne multi-mode radar can be used to receive and process not only weather returns but also beacon replies merely by referring the radar system local oscillator to the radar system magnetron and providing a plurality of selectable IF amplifiers.

DESCRIPTION OF THE PREFERRED EMBODIMENT

Figure 1:
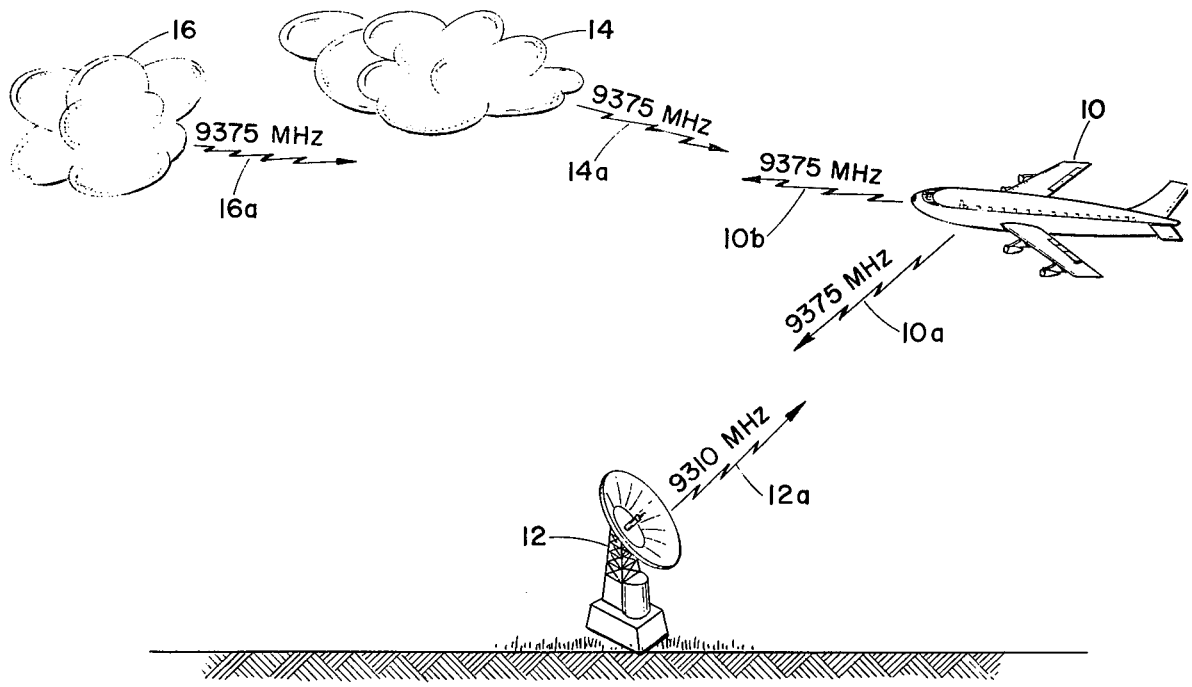
FIG. 1 illustrates a multi-mode radar equipped aircraft operating to interrogate ground beacons and to map weather cells.

Referring first to FIG. 1 there is seen an airborne aircraft 10 having a multi-mode radar system (not seen) which transmits pulses at a frequency of 9375 MHz, such transmission here illustrated by arrow 10a, pulses of which frequency are known to those skilled in the art to be able to interrogate or elicit responses from a standard aircraft navigational ground beacon here illustrated as beacon 12 and the response illustrated by arrow 12a. As known to those skilled in the art beacon replies to such interrogations are comprised of time coded pulses of 9310 MHz. When operating to interrogate ground beacons and receive the reply therefrom the multi-mode radar system is said to be operating in a beacon mode. In a second, weather mapping mode, the radar system transmits pulses at the same 9375 MHz frequency, here illustrated by arrow 10b, in a predetermined sector forward of the aircraft, eliciting radar returns from targets, such as cloud 14, which lie within the sector of interest. Assuming cloud 14 is within the maximum range of interest of the multi-mode radar its return signal, here illustrated as 14a, will be properly displayed in the aircraft cockpit, suitably on a PPI cathode ray tube (CRT), in a manner illustrative of its azimuth and range from the aircraft. In response to pulse 10b another weather target such as cell 16 which lies beyond the radar range of interest will produce a response 16a which will be eventually intercepted by the aircraft at some time, depending on range, subsequent to the time return signal 14a is intercepted by the aircraft. Since return 16a is outside the aircraft range of interest it will not be displayed on the radar CRT. It will be shown below how the radar receiver gain can be adjusted even during the time that radar returns outside the range of interest, such as return 16a, are being intercepted.

Figure 2:
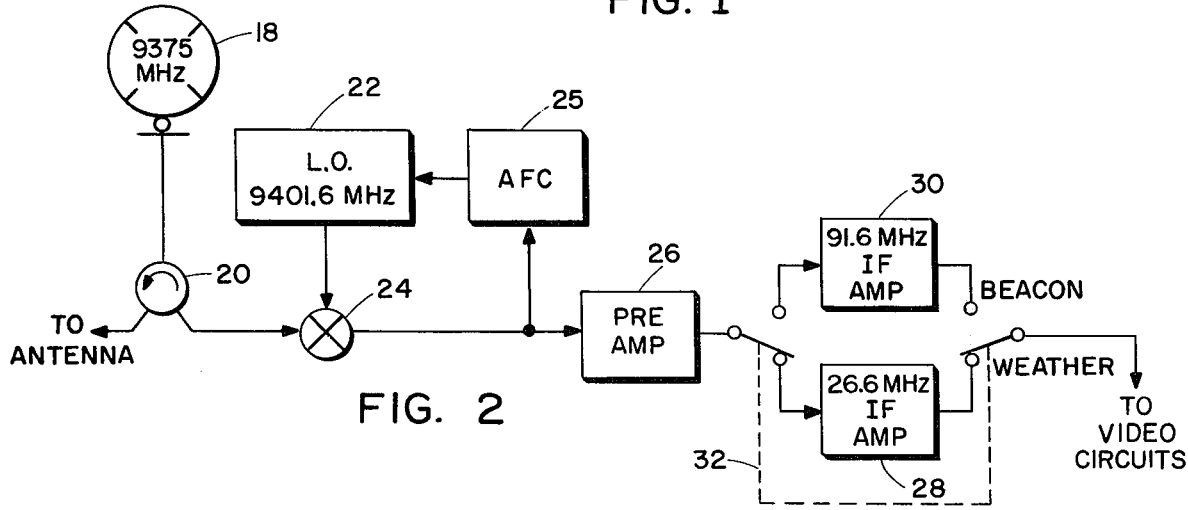
FIG. 2 is a block diagram which shows a multi-mode radar improvement which permits weather returns and ground beacon replies to be selectably received.

Refer now to FIG. 2 which shows a magnetron 18, suitably a highly stable coaxial magnetron, which delivers power at 9375 MHz through circulator 20 to the transmitting circuits of the radar system and eventually to the radar antenna (not shown) for radiation as a pulse of radar frequency at 9375 MHz.

A local oscillator 22 operating at 9401.6 MHz is referenced to magnetron 18 by means well known to those skilled in the art. During the period between transmitted pulses, return signals intercepted by the radar system are conveyed from the antenna circuits via circulator 20 to a mixer 24 wherein they are heterodyned with the local oscillator frequency. The resultant signal is used by the automatic frequency control circuit 25 to maintain the intermediate frequency constant and is also applied through preamplifier 26 via a selected one of IF amplifiers 28 and 30 to the radar video circuits. The means for selecting the proper IF amplifier is here illustrated as switch 32 which selects IF amplifier 28 which is tuned to 26.6 MHz, when operating in the weather mapping mode, or IF amplifier 30, which is turned to 91.6 MHz, when operating in the beacon mode.

As can be seen from FIG. 1 weather returns are at essentially the same frequency as the radar transmitter frequency, that is, at 9375 MHz, which frequency when mixed with the local oscillator frequency produces a difference frequency of 26.6 MHz which, of course, corresponds to the tuned frequency of IF amplifier 28. On the other hand, beacon replies are at 9310 MHz, which frequency when mixed with the local oscillator frequency produces a difference frequency of 91.6 MHz, which frequency, of course, corresponds to the tuned frequency of IF amplifier 30.

Figure 3:
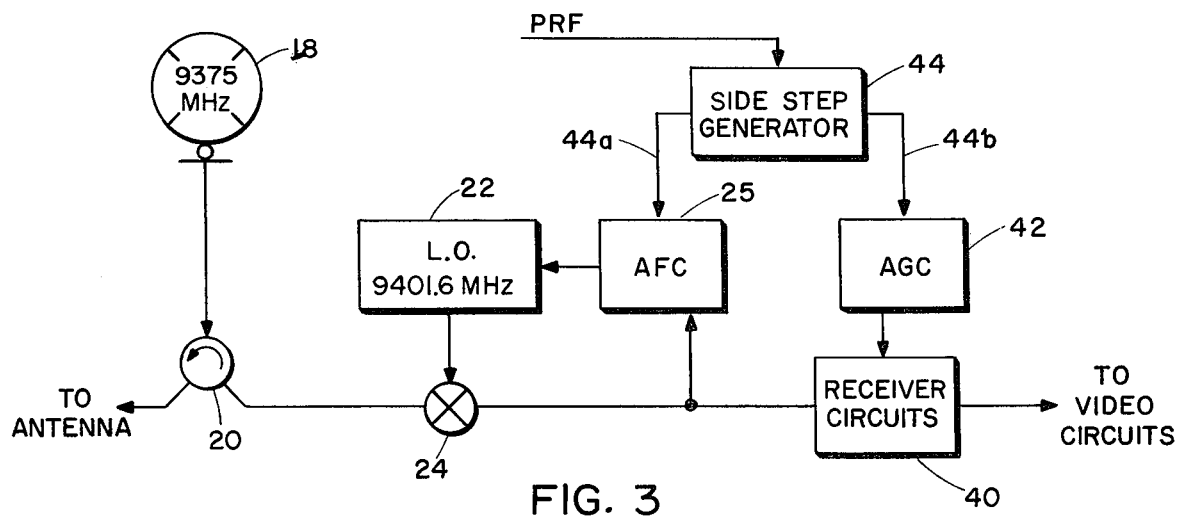
FIG. 3 is a block diagram which illustrates how a side step generator is used in the present invention.

Referring now to FIG. 3, there is seen the magnetron 18, circulator 20, local oscillator 22, mixer 24 and automatic frequency control circuits 25 previously seen in FIG. 2. Mixer 24 is seen supplying the mixed frequency products of local oscillator 22 and the intercepted radar returns, as received at circulator 20 to receiver circuits 40 which might include the preamplifier 26, IF amplifiers 28 and 30 and switch 32 of FIG. 2. There is also seen automatic gain control circuit 42 which operates intermittently and in response to a signal received from a side step generator 44 which can suitably comprise a simple timing circuit which is reset to some initial value by a radar pulse transmitted from the radar system and which a predetermined period of time thereafter, which period of time is correlated to the maximum radar range of interest, generates signals at lines 44a and 44b, and which maintains these signals effective for at least a second predetermined period of time. The signal on line 44b energizes automatic gain control circuit 42 to adjust the receiver 40 gain. The signal on line 44a causes the automatic frequency control circuit 25 to side step or detune local oscillator 22 to some new frequency widely separated from its normal local frequency of 9401.6 MHz.

In a multi-mode radar actually used, a pulse repetition frequency of 800 pulses per second was employed to give a time interval between consecutive transmitted pulses of 1.25 milliseconds, which corresponds to an approximately 100 nautical mile range. The actual range of interest was 40 nautical miles. Accordingly, side step generator 44 was designed to generate the signals on lines 44a and 44b during the second half of the interpulse period between consecutive radar transmissions. In response to the signal at line 44a the local oscillator was detuned more than one bandwidth of IF amplifier 28, so that strong signal returns from weather cells at 9375 MHz did not influence the receiver gain and gain could thus be adjusted while sampling receiver output noise.

Having read and understood the above described embodiment of our invention certain modifications and alterations thereof will become obvious to one skilled in the art. Accordingly, the invention is to be limited only by the true scope and spirit of the appended claims.

The invention claimed is:

1. A multi-mode radar system having a high power source operating at a first frequency wherein said radar system periodically transmits signals at said first frequency to thereby elicit beacon replies at a second frequency and radar returns essentially at said first frequency, said replies and said returns being subsequently intercepted by said radar system and comprising;

a local oscillator referred to said first frequency for generating a local frequency;

a mixer for generating the frequency products of said local frequency with said replies and said radar returns intercepted by said radar system;

a plurality of tuned devices, a first of which is tuned to the difference frequency of said local frequency and said second frequency and another of which is tuned to the difference frequency of said first frequency and said local frequency;

means for selecting one of said tuned devices to receive said frequency products; and, side step generator means comprising a timer which is reset to an initial time by each of said periodically transmitted signals and which thereafter side steps said local oscillator a predetermined time after being so reset.

2. The multi-mode radar system of claim 1 wherein said radar system has a range of interest and wherein said predetermined time is at least equal to the time required for radar returns from targets within said range of interest to be intercepted by said radar system.

* * * * *